(12) United States Patent
Agarwal

(10) Patent No.: US 7,686,110 B1
(45) Date of Patent: Mar. 30, 2010

(54) GARBAGE CAN MOVING SYSTEM

(76) Inventor: Anuj Agarwal, 15534 Outrigger Dr., Chino Hills, CA (US) 91709

( * ) Notice: Subject to any disclaimer, the term of this patent is extended or adjusted under 35 U.S.C. 154(b) by 9 days.

(21) Appl. No.: 12/255,410

(22) Filed: Oct. 21, 2008

(51) Int. Cl.
*A61G 5/04* (2006.01)

(52) U.S. Cl. .................... 180/13; 280/47.26; 280/47.34

(58) Field of Classification Search ............... 180/11, 180/12, 13, 19.1, 19.3; 280/47.24, 47.26, 280/47.34
See application file for complete search history.

(56) References Cited

U.S. PATENT DOCUMENTS

| | | | | |
|---|---|---|---|---|
| 3,376,986 | A * | 4/1968 | Farber | 414/446 |
| 3,948,332 | A * | 4/1976 | Tyner | 180/19.1 |
| 5,000,467 | A * | 3/1991 | Becca | 280/47.24 |
| 5,161,635 | A | 11/1992 | Kiffe | |
| 6,033,178 | A * | 3/2000 | Cummins | 414/462 |
| D425,447 | S | 5/2000 | Hsieh | |
| 6,474,427 | B1 | 11/2002 | Tunnecliff | |
| 6,481,518 | B1 * | 11/2002 | Wu | 180/65.6 |
| 6,682,084 | B2 * | 1/2004 | Webster et al. | 280/79.5 |
| 7,021,408 | B2 * | 4/2006 | Fricker | 180/19.1 |
| 7,101,142 | B2 * | 9/2006 | Bik et al. | 414/462 |
| 7,287,765 | B2 * | 10/2007 | Murphy et al. | 280/47.26 |
| 7,461,715 | B1 * | 12/2008 | Tsai | 180/208 |
| 2004/0007402 | A1 * | 1/2004 | Kujawa | 180/53.8 |
| 2008/0038102 | A1 * | 2/2008 | Murphy et al. | 414/403 |

* cited by examiner

*Primary Examiner*—Lesley Morris
*Assistant Examiner*—Tashiana Adams

(57) ABSTRACT

A garbage can moving system includes an elongated handle having a first end and a second end. A grip is attached to the second end. A bracket assembly is attached to the handle adjacent to the first end. The bracket assembly is removably engageable with a rod positioned on a perimeter wall of a garbage can. A wheel is rotatably coupled to the handle and extends below the first end of the handle. A motor is coupled to the handle and is mechanically coupled to the wheel. The motor rotates the wheel when the motor is turned on. An actuator is electrically coupled to the motor. The motor is turned on when the actuator is actuated to an on position and the motor is turned off when the actuator is actuated to an off position.

5 Claims, 6 Drawing Sheets

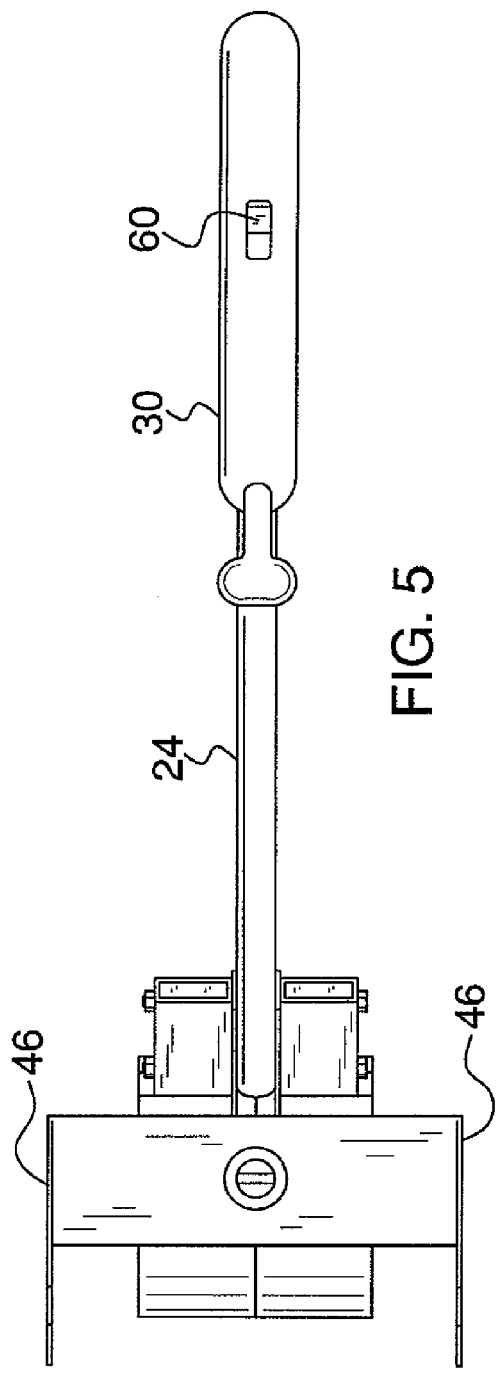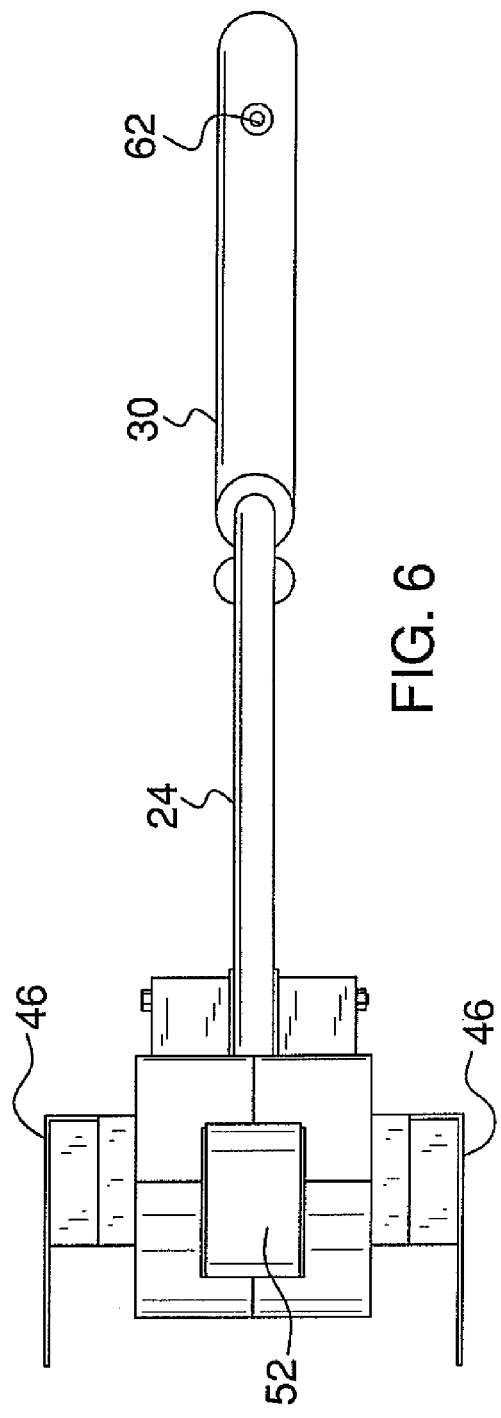

GARBAGE CAN MOVING SYSTEM

BACKGROUND OF THE INVENTION

Field of the Invention

The present invention relates to garbage can gripping and moving devices and more particularly pertains to a new garbage can gripping and moving device for assisting a person in moving a garbage can.

SUMMARY OF THE INVENTION

The present invention meets the needs presented above by generally comprising an elongated handle having a first end and a second end. A grip is attached to the second end. A bracket assembly is attached to the handle adjacent to the first end. The bracket assembly is removably engageable with a rod positioned on a perimeter wall of a garbage can. A wheel is rotatably coupled to the handle and extends below the first end of the handle. A motor is coupled to the handle and is mechanically coupled to the wheel. The motor rotates the wheel when the motor is turned on. An actuator is electrically coupled to the motor. The motor is turned on when the actuator is actuated to an on position and the motor is turned off when the actuator is actuated to an off position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view of the present invention.

FIG. 6 is a bottom view of the present invention.

DESCRIPTION OF THE PREFERRED EMBODIMENT

Figure 1:
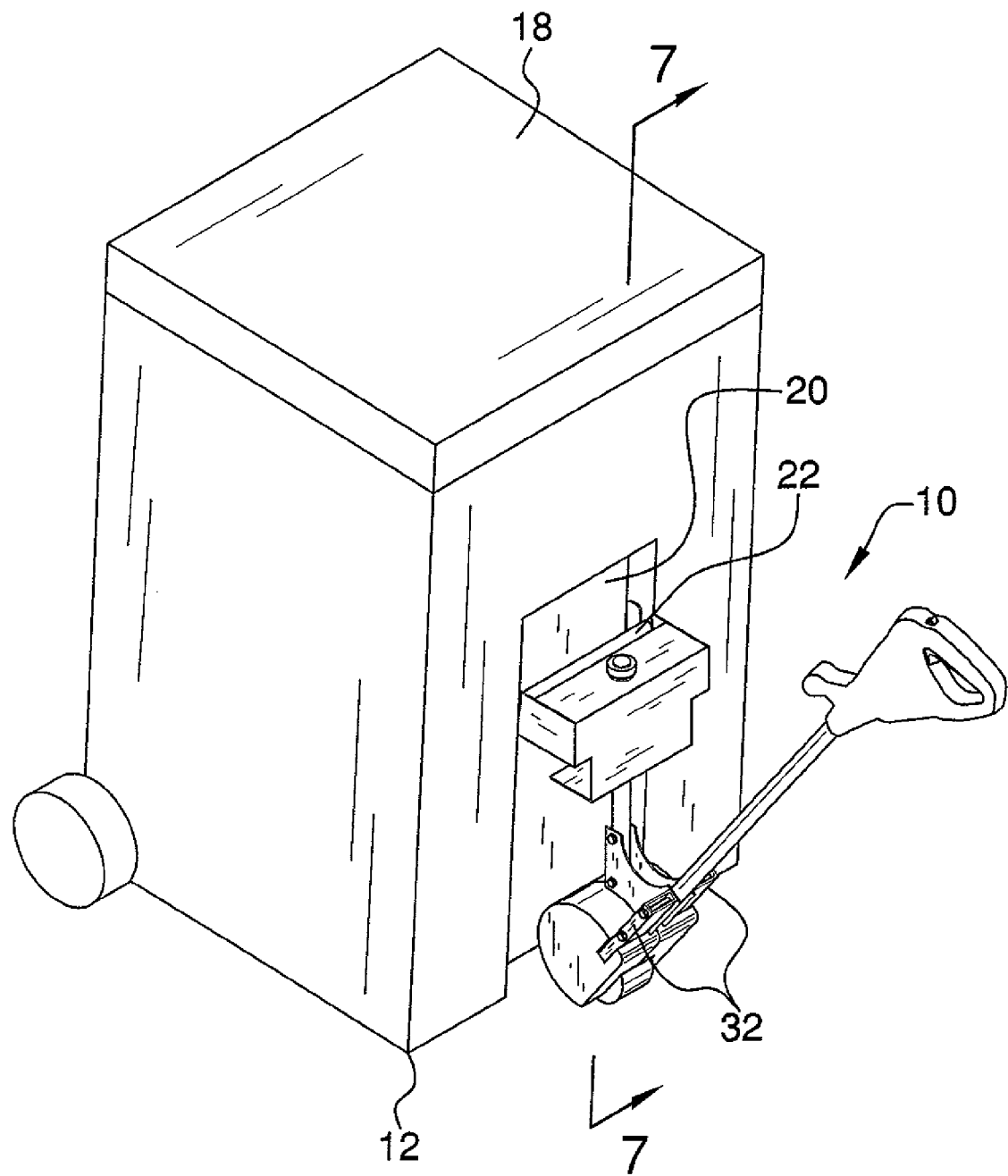
FIG. 1 is a perspective in-use view of a garbage can moving system according to the present invention.
Figure 2:
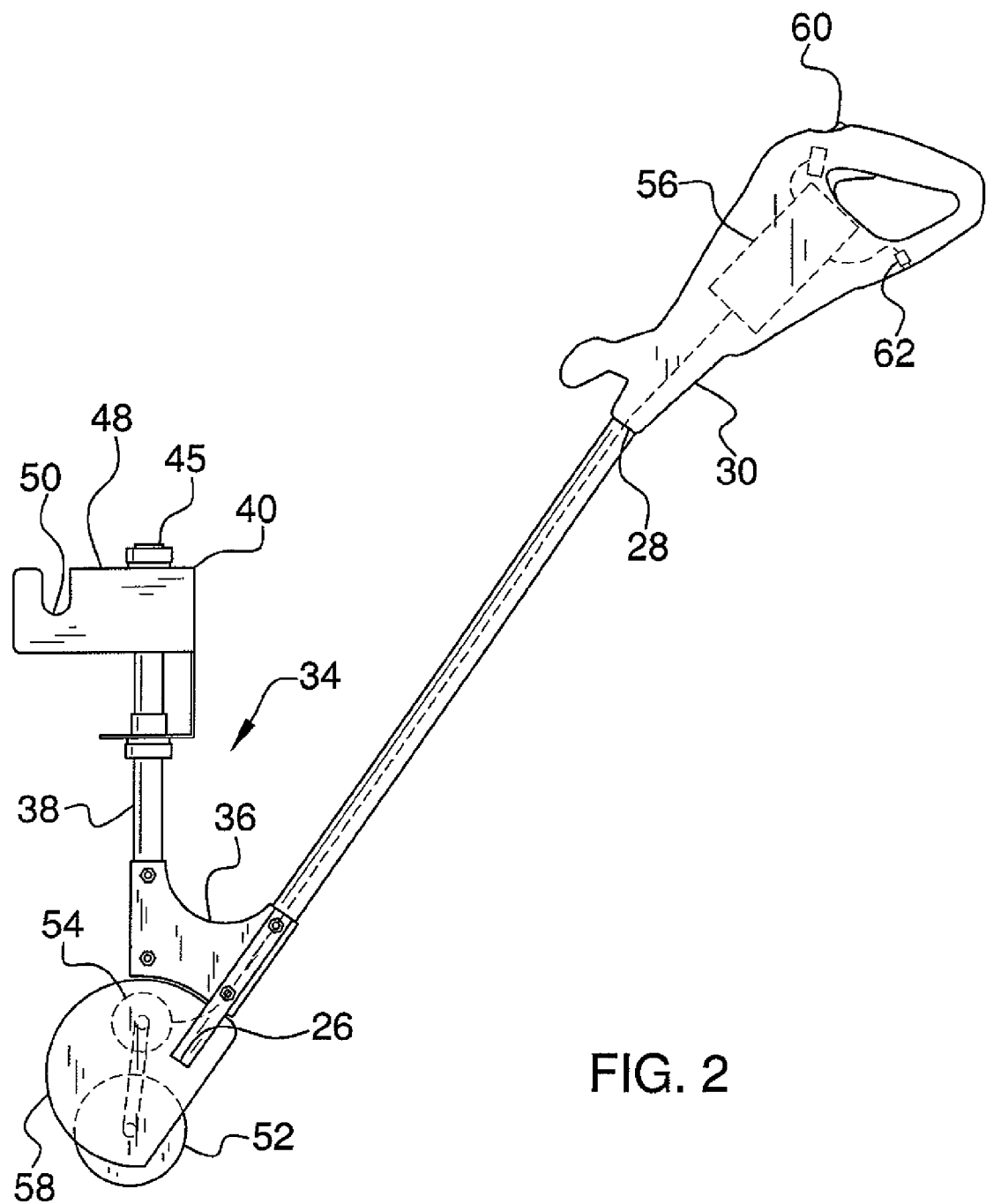
FIG. 2 is a side view of the present invention.
Figure 3:
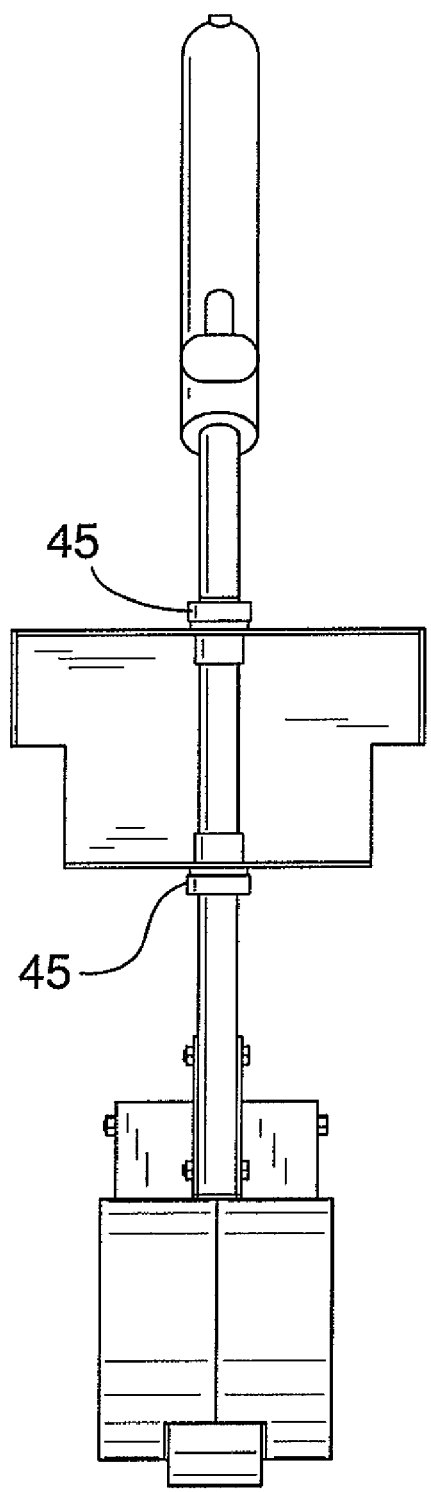
FIG. 3 is a front view of the present invention.
Figure 4:
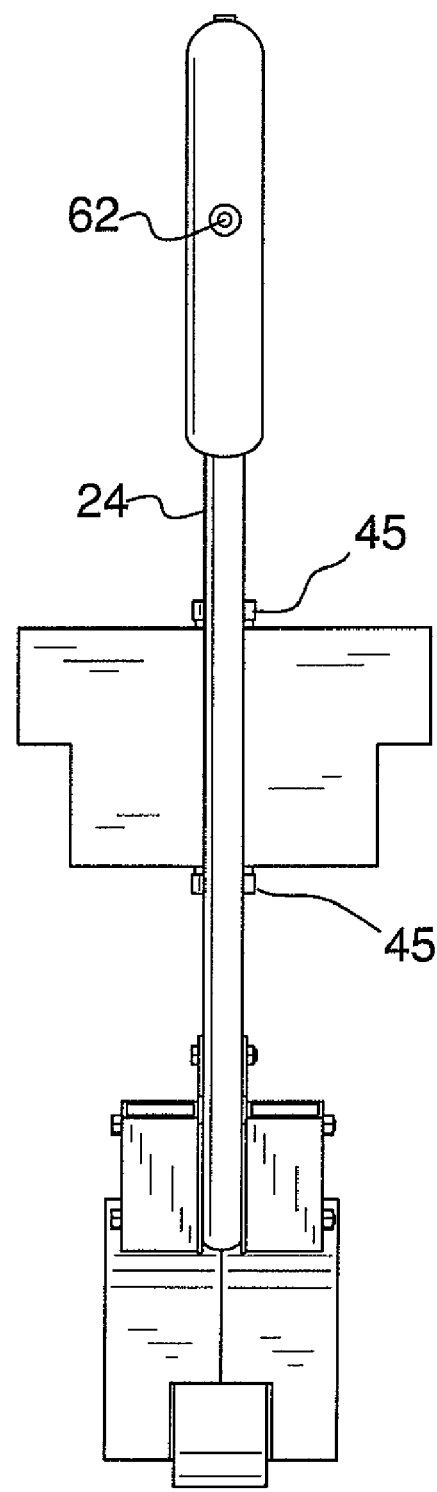
FIG. 4 is a rear view of the present invention.
Figure 7:
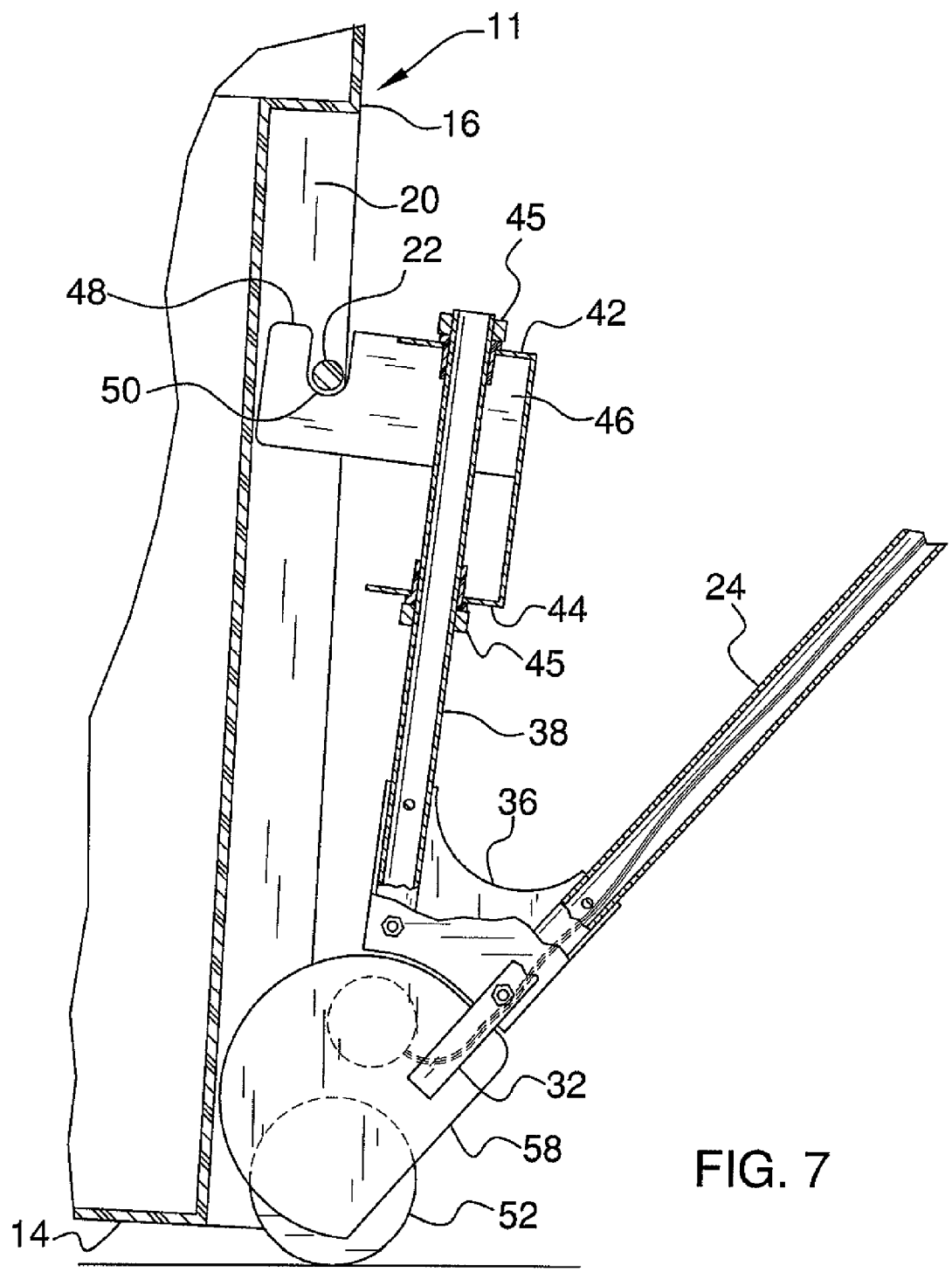
FIG. 7 is a side broken view of the present invention.
Figure 8:
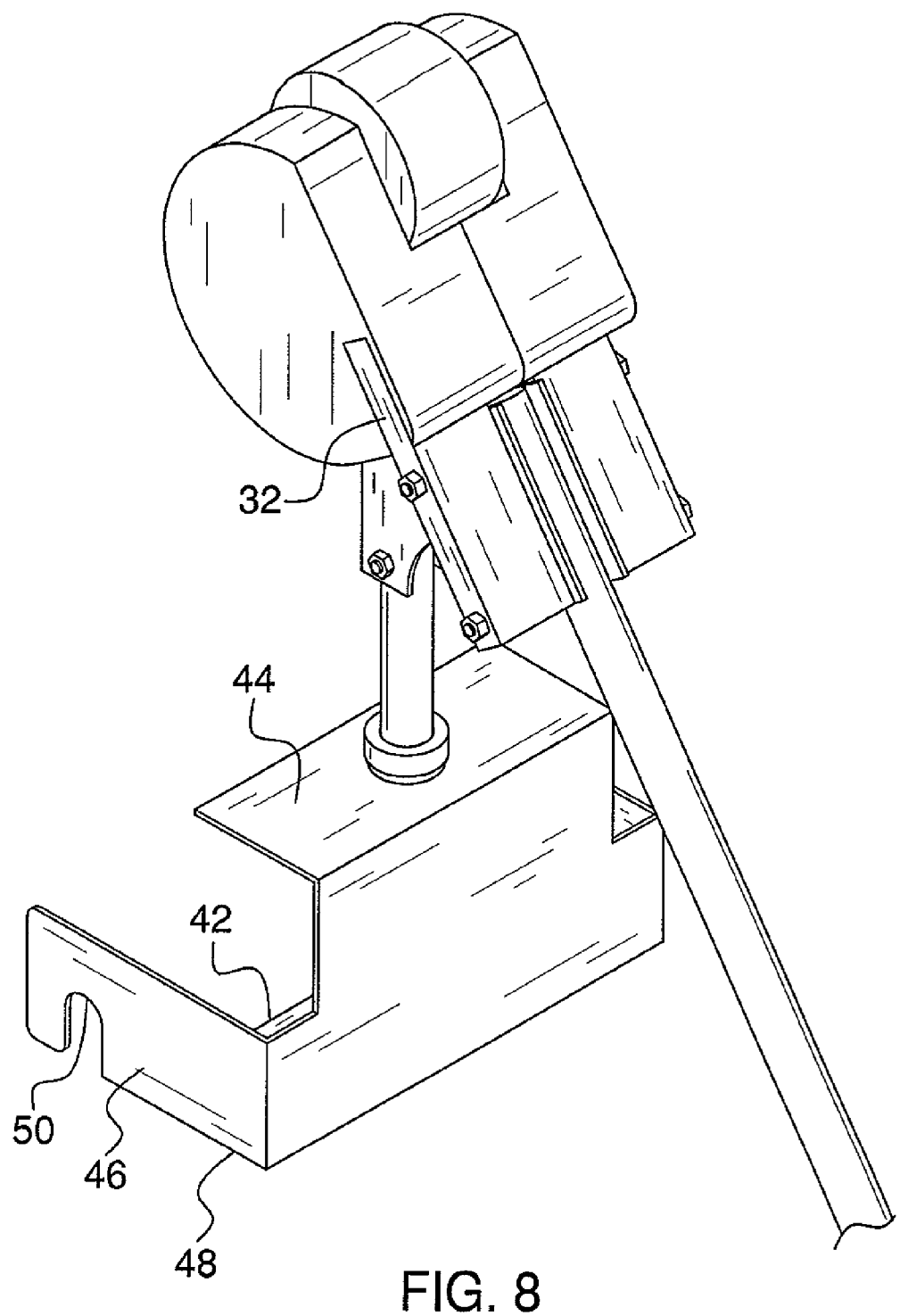
FIG. 8 is a perspective bottom view of the present invention.

With reference now to the drawings, and in particular to FIGS. 1 through 8 thereof, a new garbage can gripping and moving device embodying the principles and concepts of the present invention and generally designated by the reference numeral 10 will be described.

As best illustrated in FIGS. 1 through 8, the garbage can moving system 10 generally comprises a housing 12 that defines a garbage can 11 and includes a bottom wall 14 and a perimeter wall 16 that is attached to and extends upwardly from the bottom wall 14. A cover 18 is removably positioned on the perimeter wall 16 to close the housing 12. The perimeter wall 16 has a depression 20 therein and a horizontally orientated rod 22 is mounted in the depression. The garbage can 11 is generally conventional and the rod 22 is typically used during the mechanical lifting and emptying of the garbage can 11.

An elongated handle 24 is provided that has a first end 26 and a second end 28. A grip 30 is attached to the second end 28. The elongated handle 24 may comprise a hollow pipe comprised of a metallic or plastic material and the first end 26 may include a pair of spaced arms 32.

A bracket assembly 34 is attached to the handle 24 adjacent to the first end 26. The bracket assembly 34 is removably engageable with the rod 22. The bracket assembly 34 includes a coupler 36 that is attached to the handle 24. A post 38 is attached to the handle 24 by the coupler 36 and an angle formed between the post 38 and the handle 24 is less than 50 degrees. A catch 40 is mounted on the post 38. The catch 40 is positionable under and receives the rod 22 to couple it to the handle 24. The catch 40 includes a top wall 42, a bottom wall 44 and a pair of lateral walls 46 that are attached to the top 42 and bottom 44 walls and which extend outwardly away from the top 42 and bottom 44 walls in a direction opposite of the handle 24. The post 38 extends through the top 42 and bottom 44 walls and are is selectively movable upwardly or downwardly on the post 38 to adjust a height of the catch 40. The top 42 and bottom 44 walls are lockable in place on the post 38 with fasteners 45. Each of the lateral walls 46 has an upper edge 48 that has a slot 50 therein. The rod 22 is positionable in the slots 50.

A wheel 52 is rotatably coupled to the handle 24 and extends below the first end 26 of the handle 24. A motor 54 is coupled to the handle 24 and is mechanically coupled to the wheel 52. The motor 54 rotates the wheel 52 when the motor 54 is turned on. The motor 54 may be an electric motor powered by a rechargeable battery 56. The wheel 52 and the motor 54 may each be mounted within a housing 58 mounted between the arms 32 of the first end 26. An actuator 60 is electrically coupled to the motor 54. The motor 54 is turned on when the actuator 60 is actuated to an on position and turns the motor 54 off when the actuator 60 is actuated to an off position. The actuator 60 is positioned on the grip 30. A power port 62 is electrically coupled to the battery 56 to allow the battery 56 to be electrically coupled to a power socket to recharge the battery 56.

In use, the bracket assembly 34 is positioned under and then engaged with the rod 22 on the garbage can 11. The bracket assembly 34 is adjustable to allow it to be fitted to garbage cans 11 of varying heights and constructions. The second end 28 of the handle 24 is then tilted back, away from the garbage can 11, which causes the bracket assembly 34 to lift the garbage can 11 upwardly off of the ground. The motor 54 is then turned on and the garbage can 11 then moved as needed. The motor 54 may include both forward and reverse modes to have greater control over the moving the garbage can 11. The grip 30 is used to steer the system 10 to direct the garbage can 11 as needed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A garbage can moving system being engageable with a horizontally oriented rod mounted in a perimeter wall of the garbage can to selectively grip and move the garbage can, said system including:
    an elongated handle having a first end and a second end;
    a bracket assembly being attached to said handle adjacent to said first end, said bracket assembly being removably engageable with a horizontally oriented rod;
    a wheel being rotatably coupled to said handle and extending below said first end of said handle;
    a motor being coupled to said handle and being mechanically coupled to said wheel, said motor rotating said wheel when said motor is turned on;
    an actuator being electrically coupled to said motor, said motor being turned on when said actuator is actuated to an on position and turning said motor off when said actuator is actuated to an off position;
    a post being attached to said handle, an angle formed between said post and said handle being less than 50 degrees; and
    a catch being mounted on said post, said catch being positionable under and receiving the rod.

2. The system according to claim 1, further including a grip being attached to said second end.

3. The system according to claim 1, wherein said catch includes a top wall, a bottom wall and a pair of lateral walls being attached to said top and bottom walls and extending outwardly away from said top and bottom walls in a direction opposite of said handle, said post extending through said top and bottom walls, said top and bottom walls being selectively movable upwardly or downwardly on said post to adjust a height of said catch, each of said lateral walls having an upper edge having a slot therein, said rod being positionable in said slots.

4. The system according to claim 2, wherein said actuator is positioned on said grip.

5. A garbage can moving system comprising:
    a housing defining a garbage can and including a bottom wall and a perimeter wall being attached to and extending upwardly from said bottom wall, a cover being removably positioned on said perimeter wall to close said housing, said perimeter wall having a depression therein, a horizontally orientated rod being mounted in said depression;
    an elongated handle having a first end and a second end, a grip being attached to said second end;
    a bracket assembly being attached to said handle adjacent to said first end, said bracket assembly being removably engageable with said rod, said bracket assembly including;
    a coupler being attached to said handle;
    a post being attached to said handle by said coupler, an angle formed between said post and said handle being less than 50 degrees;
    a catch being mounted on said post, said catch being positionable under and receiving said rod, said catch including a top wall, a bottom wall and a pair of lateral walls being attached to said top and bottom walls and extending outwardly away from said top and bottom walls in a direction opposite of said handle, said post extending through said top and bottom walls, said top and bottom walls being selectively movable upwardly or downwardly on said post to adjust a height of said catch, each of said lateral walls having an upper edge having a slot therein, said rod being positionable in said slots;
    a wheel being rotatably coupled to said handle and extending below said first end of said handle;
    a motor being coupled to said handle and being mechanically coupled to said wheel, said motor rotating said wheel when said motor is turned on; and
    an actuator being electrically coupled to said motor, said motor being turned on when said actuator is actuated to an on position and turning said motor off when said actuator is actuated to an off position, said actuator being positioned on said grip.

* * * * *